Dec. 19, 1961   J. BUGOSH   3,013,903
FIBROUS SUBSTRATE WITH AN ALUMINA BONDED ORGANIC POLYMER COATING
Filed April 13, 1959
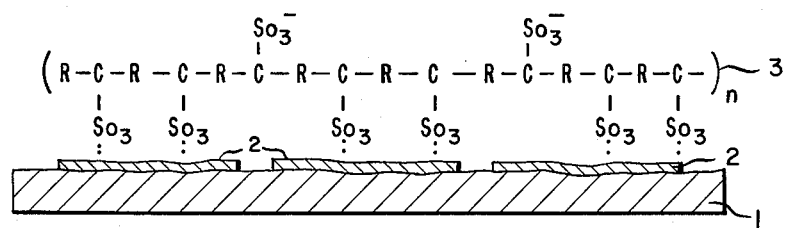
INVENTOR
JOHN BUGOSH
BY Fred C. Carlson
ATTORNEY 3,013,903
FIBROUS SUBSTRATE WITH AN ALUMINA
BONDED ORGANIC POLYMER COATING
John Bugosh, Wilmington, Del., assignor to E. I. du Pont de Nemours and Company, Wilmington, Del., a corporation of Delaware
Filed Apr. 13, 1959, Ser. No. 805,672
7 Claims. (Cl. 117—76)

This invention concerns fibrous substrates bearing a basecoat of colloidal alumina and a topcoat of organic polymer containing ionic sulfonate groups and to methods for making the same.

The application of organic polymers containing sulfonate groups as topcoatings over base coatings of colloidal alumina particles upon fibrous substrates promotes and stabilizes the adherence of alumina particles to the fiber substrates in a most unexpected manner. Yet, such topcoatings do not detract seriously from the beneficial effects obtained from using colloidal alumina coatings upon fibers. The result is that topcoatings of organic polymers containing sulfonate groups enhance the desired properties of colloidal alumina coatings. Great improvements in the resistance to soiling and in the washability of fabrics made from fibers so treated are observed, for example. This specification discloses other novel and useful effects obtained by practicing this invention and those skilled in the art will appreciate still other advantages of this invention.

More particularly, this invention is directed to processes whereby at least one organic polymer containing sulfonate groups is applied as a topcoating over at least one type of colloidal alumina applied to the surface of a fiber or fibers. The invention is also directed to the so coated fibrous materials and to the articles made using these coated fibrous materials such as textiles and the like.

In the drawing, which is not to scale, there is illustrated an embodiment of the invention showing a section of substrate fiber 1, said fiber before coating being one having a positively charged surface, bearing a base coat of colloidal alumina particles 2 and said base-coated surface having a topcoat 3 of organic polymer containing sulfonic acid radicals.

The invention will now be described in detail.

THE FIBER SUBSTRATES

In general, the fibrous material comprising the substrate to be coated with colloidal alumina need have no special attributes. Physical characteristics such as density, porosity, surface area, strength and the like and chemical characteristics such as compositions, natural or synthetic origin and the like are, in general, not significant.

It is preferred, however, that the surface of the fiber to be treated with colloidal alumina be negatively charged with respect to the colloidal alumina. This is because such colloidal alumina, which is regarded as being positively charged, tends to exhaust uniformly and substantively upon the surfaces of fibers negatively charged. Thus, fibers which have negatively charged surfaces (with respect to the colloidal alumina particles) can be effectively coated in mono or multiple particle layers with colloidal alumina by simply bringing the substrate fiber surface into intimate contact with liquid dispersions of such positively charged colloidal aluminas.

Thus, when negatively charged substrate fiber surfaces are coated using dispersions of colloidal aluminas (the dispersions actually being either sols or suspensions of the colloidal aluminas), according to the teachings of the present invention, several distinct types of monomolecular forces may be involved in bonding the colloidal aluminas to these substrate surfaces. Those bonds due to opposite polar charges are concerned with Van der Waal's forces commonly having an energy of the order of 2,000 to 10,000 calories per mole. Chemical linkages through covalent bonds have an energy value of from about 10,000 to 200,000 calories per mole. Coordination bonding approximates covalent bonding in strength.

Generally, those fibers containing electronegative atoms are characterized by having substantial proportions, that is, above 5%, of an element or elements selected from the group consisting of oxygen, nitrogen, halogen and sulfur. These elements frequently are present in highly polar groups such as —OH, —NH$_2$, —COC—, —NH—, —CO, —CN, —COOH, —SO$_3$H, and others. Such fibrous substrates have a negative ionic charge in water when the polar group is at least slightly acidic in nature, such as —COOH, —SO$_3$H, —SH, —CONH—. Fibers having negatively charged surfaces which can be satisfactorily coated with colloidal aluminas for purposes of this invention include most of the principal industrially important, natural and synthetic fibers.

Those fiber substrate materials which are not negatively charged with respect to the colloidal aluminas or which do not contain substantial proportions of highly polar groups like those above indicated can nevertheless be adopted for use in the processes and products of this invention either by modifying their surfaces as by chemical incorporation of compounds which of themselves have substantial proportions of highly coated polar groups or by associating such materials with other materials which have negatively charged surfaces. Thus, polymers and copolymers during manufacturing processes for aging periods can partially oxidize or they can assimilate on or near their exposed surfaces certain compounds having free carboxylic, aldehydic, or other groups in sufficient amount to impart negative characteristics to surfaces normally not highly negatively charged. Further, natural and synthetic fibers, resins and broadly those polymers and copolymers containing substantial amounts of nitrogen, oxygen, halogen, sulfur, and the like can be incorporated into fabrics and fibers thereby presenting negatively charged surfaces which bond readily with colloidal aluminas. Thus, this invention is generically applicable to the large majority of fibers because those fibers which do not display negative characteristics can readily be modified so as to become negatively charged to the extent necessary for use in the processes and products of this invention. The surfaces of many fibers become negatively charged especially in water above pH 7.

Thus, natural and synthetic fibers of organic or inorganic origin can be used as substrates for use in the processes and products of this invention. Such fibers can be woven together so as to form fabrics and fabric-like materials as is fully appreciated in the art.

The term "fiber" includes both inorganic and organic and synthetic and naturally occurring fibers. The term "fiber" includes staple, yarn, filaments, card sliver, twisted continuous filaments, and the like. It includes materials intended for use in fabrics in any stage of processing. The term "fiber" includes reinforcing fibers intended for plastic laminates, tire cord, and the like. The term "yarn" includes not only those yarns for textile usage, but also those for reinforcing other materials such as those yarns used in tire cord, rubber, felting, conveyor belting and the like. The term "fabric" includes materials which are woven, knitted, felted, fused or otherwise constructed from fibers; for example, the term "fabric" includes pile fabrics and paper fabrics.

Examples of natural fibers include cotton, flax (linen), hemp, jute, ramie, sisal, abaca, pharmium, silk, wool, fur, hair of all types (such as goat and horse), animal bristles of all types (such as hog and camel), straw, asbestos and the like.

Synthetic fibrous materials which may be used as the substrate include those made from polyamides, such as poly(hexamethylene adipamide), poly(hexamethylene sebacamide), polycaproamide, and copolyamides, polyesters and copolyesters such as condensation products of ethylene glycol with terephthalic acid, ethylene glycol with a 10/100 mixture of terephthalic/isophthalic acids, ethylene glycol with a 98/2 mixture of terephthalic/5-(sodium sulfo)-isophthalic acids, and trans-p-hexahydroxylylene glycol with terephthalic acid, polyacrylonitrile, copolymers of acrylonitrile with other monomers such as vinyl acetate, vinyl chloride, methyl acrylate, vinyl pyridine, sodium styrene sulfonate, terpolymers of acrylonitrile/methylacrylate/sodium styrene sulfonate made in accordance with U.S. Patent 2,837,501, vinyl and vinylidene polymers and copolymers, polycarbonates, polyurethanes, polyesteramides, polyethylenes, polypropylenes, fluorinated ethylene polymers and copolymers (e.g. polytetrafluoromethylene), cellulose derivatives, such as cellulose acetate, cellulose triacetate, composite filaments such as, for example, a sheath of polyamide around a core of polyester as described in the copending application of Breen, S.N. 621,443, filed November 9, 1956, now abandoned, and self-crimped composite filaments, such as two acrylonitrile polymers differing in ionizable group content spun as a sheath and core as described in the copending application of Taylor, S.N. 640,722, filed February 18, 1957, now abandoned, regenerated cellulose, glass, and the like. Blends of two or more synthetic or natural fibers may be used, as well as blends of synthetic and natural. The fibers and filaments may be crimped or uncrimped, drawn or undrawn, and/or bulked or unbulked. Two or more synthetic fibers with or without natural fibers may be blended. Other synthetic fibers include, for example, "Dacron" (a du Pont trademark) polyester fiber, "Orlon" (a du Pont trademark) acrylic fiber, "Zefran" (a Dow trademark) acrylic fiber; "Dynel" (a Union Carbide trademark) acrylic fiber; linear polyamides including nylons, "Teflon" (a du Pont trademark) polytetrafluoroethylene, "Terylene" (a trademark of Imperial Chemical Industries) polyethylene terephthalate polymer, homopolymers, regular copolymers as well as graft copolymers, segmented elastomers, etc. The term also includes materials produced from derivative and regenerated forms of natural polymers such as rayons and proteinaceous fibers as "Ardil," "Vicara" and the like made from casein, peanut protein and so forth. Glass fibers as well as asbestos, rock wool, and silica fibers are excellent fibrous substrates for the processes and products of this invention.

COLLOIDAL ALUMINAS

In general, the aluminas useful in the products and processes of this invention are in the form of aluminum oxide particles having an average size of less than about 1.5 microns in their largest dimension and an average specific surface area greater than about 10 square meters per gram (as by nitrogen adsorption). These particles can be of any shape—spheres, fibers, platelets, etc.

Such aluminas are non-dialyzable, that is, they do not pass through an uncoated cellophane or sausage casing membrane from aqueous medium. Aluminum compounds which pass through such a casing are not in colloidal form but in true solution and are not to be classed with the aluminas useful in the processes and products of this invention.

To determine whether an aluminum compound is dialyzable, one places 100 cubic centimeters of a one percent solution or dispersion of the aluminum compound in water in cellophane sausage casing. These uncoated cellophane sausage casings are sold by the Fisher Scientific Company, Philadelphia, Pennsylvania, as seamless cellulose dialyzer tubing, ¾ of an inch in diameter and have a wall thickness of 0.00072 inch. This filled casing, tied off at each end, is suspended in 4 liters of distilled water and agitated continuously for four days at 25 to 20° C. Colloidal aluminas do not pass through this cellophane membrane but soluble aluminum salts do so. Therefore, the amount of alumina remaining in the cellophane sausage casing corresponds to the total non-dialyzable alumina present in the original sample. However, since there is an equilibrium condition of soluble aluminum salts between the inside and the outside of the cellophane membrane, there will in all cases be one four-hundredth ($\frac{1}{400}$) of the soluble or dialyzable alumina remaining within the cellophane bag, and this amount should be subtracted from the alumina remaining in the bag in order to correct for the small amount of soluble alumina remaining there in equilibrium. Certain aluminum salts which are originally dialyzable form some colloidal alumina on long standing in dilute aqueous solution, especially if partly neutralized with base. Certain poorly defined, so-called basic aluminum salts in aqueous solution contain a fraction of the alumina content in colloidal form, when examined by the above method. It is generally preferred to use solutions or dispersions where at least 5% of the alumina is in colloidal form and more preferably at least 50% in the colloidal form.

Many comercial aluminas are rather heterogeneous as to their particle sizes and contain particles which are larger than colloidal size but this does not exclude their applicability for use in processes and products of this invention.

Generally, a certain fraction of heterogeneous aluminas is of sufficiently small particle size to form coatings on the fibers used as substrates in this invention. Ordinarily, it is most desirable to use particles about which are small and of colloidal dimensions (i.e. less than 400 millimicrons) because those of super-colloidal size tend to become trapped in the fiber or fabric and will whiten it to an undesirable degree.

Thus, it is preferred that the aluminas used have a specific surface area greater than 25 square meters per gram and preferably greater than 100 m.$^2$/g. it is also preferred that the particles be relatively non-aggregated and that the ultimate discrete particles in the dispersion have a size corresponding to the specific surface area.

While larger particle sized aluminas may be present where whitening of fabrics is not objectionable, the beneficial results obtainable by coating fibrous substrates in accordance with the invention are usually best obtained by using alumina particles which are colloidal in size.

Many different types of aluminas are known and a number of these are available commercially. One class of colloidal aluminas are the alpha aluminas. On the market these tend to be sold as inexpensive products. The Aluminum Company of America sells two grades of alpha alumina, A-1 and A-3 which have surface areas ranging from about 20 to 70 square meters per gram. The Monsanto Chemical Company sells an alpha alumina product called "laminar alumina" which is composed of plate-like particles containing alph alumina. In such alumina, the particle size across the flat surface ranges from about 0.15 to 10 microns and in thickness from about 0.002 to 0.04 micron, and the surface area of these particles averages about 39 square meters per gram.

Another class of colloidal aluminas are the gamma aluminas, which are produced especially by the burning or thermal hydrolysis of aluminum salts such as aluminum chloride. These aluminas are generally composed of almost spherical particles which contain a small amount of residual anion such as chloride. These dry powders will usually form crude dispersions in water or in organic solvents. Such materials can be made by processes well known to the art. A typical, commercially available gamma alumina product is made by Godfrey L. Cabot and/or Degussa of Germany and is termed "Alon C," a trademark. The particle size range of this product is from about 0.01 to 0.04 micron and the surface area ranges from about 50 to 100 square meters per gram. Such materials can be made by processes described in one or more of the following patents: German 902,731, German 830,786, German 877,891, U.S. 2,780,525, and British 707,389.

Another class of colloidal alumina is alpha alumina monohydrate, sometimes termed "diaspore." A fine particle size synthetic diaspore can be made according to the procedure described, for example, in the Journal of Geology, vol. 59, at pages 381 to 393 (1951).

Another class of colloidal alumina is gamma alumina monohydrate, sometimes termed "boehmite." Examples of such aluminas are disclosed in U.S. Patent No. 2,816,079, which describes an alumina aerogel which probably contains some boehmite platelets and in U.S. Patent No. 2,590,833, which describes an alumina sol containing a mixture of boehmite and other alumina.

Another class of colloidal aluminas is gamma aluminum hydroxide, sometimes called "gibbsite" which is a fine particle size, precipitated, crystalline aluminum hydroxide. The Aluminum Company of America sells such a colloidal alumina under the trade designation C-730 and is said by the manufacturer to be about 50 millimicrons in size and to have average surface area of about 10 square meters per gram. Gibbsite aluminas can be made by the processes of U.S. Patent No. 2,549,549.

Another class of colloidal aluminas are the alpha aluminum hydroxides sometimes termed "Bayerites" which is a fine particle size alumina when prepared as described in a publication by the Aluminum Company of America entitled "Technical Paper No. 10 (Revised) Alumina Properties" by Allen S. Russell et al. (1956), page 49.

Another class of colloidal aluminas are the amorphous gels which typically are peptizable with or without some heating, to alumina dispersions. Sometimes they contain extremely finely divided Gibbsite, Bayerite, or Boehmite, but the particles, in general, are usually too small to be seen in the electronmicroscope. Such sols can be prepared by any commercial conventional means. For example, see the U.S. Patents Nos. 2,590,833; 2,085,129; and 2,163,922. See also U.S. Patents Nos. 2,154,603; 1,958,710; 2,137,683; 2,657,115; 2,194,218; 2,656,321; 2,503,168; 2,453,847. These alumina gels can be made from a variety of starting materials well known to the art. A variety of alumina gels are commercially available; for example, the Reheis Company sells an alumina gel under trade designations F-500 and F-1000.

An especially preferred alumina for use in the processes of this invention is fibrous boehmite. Fibrous boehmite suitable in the present invention has an average fibril length in the range of from 25 to 1500 millimicrons, the remaining average dimensions being in the range of 3 to 10 millimicrons. The fibrils have a surface area of between 200 and 400 m.$^2$/g.

Preferred fibrils for use in the processes and products of this invention have an average length in the range of from about 100 to 700 millimicrons, the remaining average dimensions being in the range of from 3 to 5 millimicrons, the axial ratio being from 50:1 to 150:1, and a surface area of from 250 to 350 m.$^2$/g.

Further descriptions of fibrous boehmite herein seem unnecessary, since this substance and its characteristics are fully disclosed and discussed in the aforementioned Serial No. 783,602, now Patent No. 2,915,475, which material is incorporated herein by reference to the extent necessary.

Boehmite alumina in the form of platelets can be used in this invention; see U.S. application Serial No. 668,68 filed June 28, 1957.

For a general description of the production of colloidal aluminas, see, for example, the H. V. Weiser book, vol. II, pages 103-113, published by John Wiley and Sons, Inc., New York, N.Y. (1935), "Inorganic Colloid Chemistry."

Colloidal aluminas are considered to be positively charged because these particles when in aqueous suspension, have such a charge that the particles move to the negative electrode when subjected to a direct current voltage in an electrophoresis apparatus. Such positive charge is most apparent when the aqueous suspension has a pH between 1 and 6 adjusted with hydrochloric acid. This charge on the particles can be very small.

ORGANIC POLYMERS CONTAINING SULFONIC ACID GROUPS

The ionic organic polymers useful in the products and processes of this invention have average molecular weights of at least 500 and preferably above 1,000. The maximum molecular weight is not critical and can range to 100,000, 500,000 or more, so long as the polymer is in some manner applicable and reactable with the colloidal alumina coated substrate fibrous material, as is explained herein.

These polymers contain a plurality of reoccurring lateral free sulfonic acid groups, such as lateral sulfonic groups being attached either directly to a carbon atom of the polymer chain or through intervening lateral structures to the polymer chain. The polymers should contain an average of at least 1 weight percent such lateral free sulfonic acid radicals but there is no critical upper limit on the average number of such groups per molecule.

By the terms "dispersion," "dispersible" or the like, it will be understood that reference is had not only to mere suspensions of polymer particles (usually colloidal) in aqueous or organic solvents, but also to true solutions. Thus, a true solution of these polymers can be filtered through a No. 1 Whatman filter paper. If there are no other materials present in the solution of the polymer, such solution is relatively clear or transparent.

Some of these acidic organic polymers are not necessarily capable of forming true solutions in a solvent such as in water, but instead form stable dispersions in a solvent such as water. Such dispersions are commonly referred to as lattices. Many lattices at, for example, a 10 weight percent dispersion give a marked turbidity causing such solutions to appear milky but translucent. At concentrations of about 0.1 weight percent or somewhat greater such dispersions of organic polymers containing acid groups are stable and do not settle out or cream on standing. Such lattices may in many instances, tend to dry down to form a coherent film on glass, for example.

Thus, preferably the organic polymers containing sulfonic groups are in the form of monovalent cation salts of the acidic groups and are dispersible in water or organic solvents to the extent of at least about 0.1 weight percent.

In general, these polymers all have polymer chains made up of carbon atoms and their structures are determined by the particular monomer or combination of monomers originally polymerized as the art fully understands and appreciates. That part of the polymer contacting the colloidal alumina actually will chemically bond to the alumina. These chemical forces binding the organic polymer to the alumina can either be coordinate or covalent. The same chemical forces are at work here as were described earlier in indicating the nature of the forces bonding the colloidal alumina to the surface of the fiber substrates.

Because such organic polymers containing sulfonic groups are most easily applied to alumina coated substrates through liquid carriers or solvents, usually these polymers will be employed with the acidic groups initially in the form of the salts of monovalent cations, such as the alkali metals, lower alkyl amines, and lower alkanol amines. A preferred cation is sodium. The salts will be used because the organic polymers containing acidic groups are preferably dispersible in water to the extent that at least 0.1 weight percent, such dispersibility being achieved by incorporating into the polymer a sufficient number of acid groups to solubilize the polymer and then neutralizing such acidic groups with monovalent cations.

Instead of using dispersible polymers as described above, one can use powdered forms of the organic polymers containing carboxylic acid groups and these can be fused to the alumina substrate by a heating operation as will be explained below. Also, one can actually form the organic polymer containing a sulfonic acid group by first applying a polymerizable acid to the alumina substrate and then applying a material copolymerizable with the polymerizable acid over such acid and form the desired polymeric topcoat in situ as is explained below.

The organic polymer containing sulfonic acid groups can contain other acidic groups. Organic polymers containing sulfonic acid groups can be manufactured according to processes described, for example, in the following U.S. Patents: 2,348,705; 2,601,256; 2,837,500; 2,837,501.

By the term "ionic" is meant that the sulfonate is in an ionizable condition such as the free acid or a soluble salt of a cation. This limitation is made in order to exclude sulfonate groups which are fully esterified and which, therefore, are not ionizable unless the ester group is first hydrolyzed off.

COATING SUBSTRATES WITH ALUMINA AND POLYMER

In general, by the processes of this invention, the alumina is first applied to a fibrous substrate and then the organic polymer is applied thereupon.

The aluminas can be applied to fiber substrates as dry powders, as suspensions or sols in liquid carriers, or even as pastes, using conventional application techniques.

Aqueous suspensions or sols will usually be employed in applying the aluminas. The particles exhaust substantively upon substrate surfaces.

Dispersions of colloidal aluminas can be stabilized with acids or other agents as the art well knows and appreciates. See, for example, the above-identified H. V. Weiser book, vol. II, pages 106 through 111, incl. The concentration of colloidal alumina in such dispersions can vary widely.

Concentrations of less than about 0.1 weight percent colloidal aluminas in dispersions or sols using aqueous or organic liquid carriers can be used especially since the positively charged colloidal aluminas exhaust substantively upon the negatively charged fibrous substrate surfaces. Hence, upon exposure of these fibers to dispersions containing colloidal aluminas, the colloidal aluminas exhaust thereon until the solution or dispersion is essentially depleted of colloidal alumina. Usually, however, as a practical matter, the maximum initial concentration of colloidal alumina in a dispersion or sol will not be above about 5 weight percent, although, depending upon the particular alumina and carrier used, suspensions containing concentrations of alumina considerably higher than this amount can be used conveniently in practicing the invention.

Contacting a fibrous substrate to be treated with a sol or suspension of alumina is conveniently done by immersing, by painting or by spraying. Preferably the fibrous substrate surface is clean and free from foreign matter. Those skilled in the art will, of course, appreciate that for certain uses one might prefer to apply the colloidal alumina from organic liquid carriers rather than from aqueous ones by using the well-known procedures. Even emulsions can be used.

After the alumina coating step, excess alumina may be conveniently removed by any conventional means such as rinsing, drying or the like.

If aluminas are applied to the fiber substrates as dry powders, a dry substrate surface can be sprinkled or dusted with such dry powder and the excess powder is then conveniently removed by shaking or blowing. Pastes can be applied by patting or the like.

Actual exposure of the fibrous substrate to the alumina can be by any procedure known to the art. A heat set thereafter using a short bake at, depending on the fibrous substrate, say 60–300° C. is sometimes useful.

When alumina is adsorbed onto fibrous surfaces from very dilute aqueous sols, it is often expedient to promote the exhaustion of the colloid from the solution by adjustment of the solution acidity (pH), or by the addition of certain inorganic salts or other agents. For example, the rate of exhaustion of colloidally suspended alumina, from an aquasol of less than about 0.1% alumina concentration, onto "Orlon" fabric is increased several fold when the treating bath, which initially usually has a pH of about 3 to 4, is gradually neutralized with dilute ammonium hydroxide or other alkali solution and finally adjusted to about pH 6 to 8. In this manner substantially complete exhaustion onto the fiber surface may often be accomplished and the total amount of alumina adsorbed will be increased with resultant increases in efficiency and economy. Similar results can be obtained by adding dilute solutions of inorganic salts, such as phosphates, borates, sulfates, or carbonates. Improved exhaustion can also be obtained by the addition, in carefully controlled amounts and concentrations, of certain negatively charged colloids or soluble high molecular weight organic polymers. Such agents used in amounts insufficient for flocculation of the alumina, decrease the stability of alumina colloid in water with a corresponding increase in its tendency to adsorb on negatively charged substrates. If the organic polymer used contains, for example, acidic groups, such amount of polymer could correspondingly decrease the amount of topcoat later applied, depending on the particular results desired. But, if too much of such polymer is used so that flocculation tends to occur, the alumina would no longer exhaust on substrates. Therefore, excessive amounts of polymer should be avoided carefully.

The exact technique used for coating a fibrous substrate surface with alumina will, of course, vary with the particular type of fiber or fabric to be coated and it is not possible to give a precise set of instructions which will be useful in all situations.

Next, the alumina coated substrate receives as a topcoat the organic polymer containing sulfonic acid groups. Usually such coating will be applied by dipping, spraying or painting, using a dispersion of the polymer in an aqueous or organic solvent or carrier. But, the topcoat can be applied by any conventional means. Thus, it can be dusted on as a dry powder and then the treated article passed through a curing or fusing step, such as heating or the like, or a polymerizable monomer can be applied by dipping, etc., which is then copolymerized in situ with a second material, as is illustrated in the examples.

When the alumina coated fiber or fabric is contacted with a dispersion containing the organic polymer, such contact is done conveniently as a practical matter by simply dipping the alumina coated fiber or fabric in or spraying with an aqueous or other solution or dispersion containing from about 0.01 to 5 weight percent of the organic polymer containing acidic groups. Often, the application will be accomplished with the aid of aqueous solutions containing wetting agents to aid in the surface coverage of the fabric by the solution.

The organic polymer is adsorbed immediately and substantively onto the alumina coating. The fabric or fiber thus treated is then conveniently rinsed thoroughly with water or other liquid to remove the excess polymer solution. The organic polymer can be applied, of course, from organic solvents if desired. However, aqueous solutions are more economical and easier to handle in most cases.

If multiple coatings are desired, the article whether fabric or fiber can be treated again with colloidal alumina followed by rinsing and the application of additional coating of organic polymer. The organic polymer coating tends to be insoluble and is not readily removable even by repeated washings with water or in various organic solvents.

In some cases, where it is desired to make the alumina adhere more firmly to the polymeric topcoat than is accomplished by simple contacting of the topcoat material with the colloidal alumina, a short heat treatment of about five minutes preferably from about 100–150° C., is applied before treating with the dispersion or solution of the organic polymer. Such heat treatments, of course, should not employ temperatures above the disintegration point of the fibrous substrate. More than a single layer of alumina particles may adhere to the fiber substrate surface. The extent to which the particles adhere and weight pick up depends upon the concentration of alumina present in the treating solution, when solutions are used. More than a single particle layer can be obtained without resort to a curing treatment.

In the case of polyester fibers like "Dacron" (a du Pont trademark) curing is desirable, and often is necessary, to make the alumina particles adhere strongly to the fiber surface. In the case of fibers which will exhaust a colloidal alumina from a sol or dispersion and form a chemical bond between the alumina and the fibers (such as acrylic polymers) it is, of course, not necessary to cure the fiber after treating with the alumina but, instead, the wet treated fabric can be treated immediately with the solution or dispersion of the polymer.

If consecutive treatments are applied without drying, the alumina coated fiber or fabric, which is moist with excess alumina dispersion, should be rinsed to remove the excess alumina before application of the polymer solution or dispersion. If the excess alumina is not removed, the free alumina particles carried along upon the fiber or fabric surface tend to precipitate the polymer from the dispersion. Such precipitation of the polymer is, of course, to be avoided since it causes uneven distribution of the polymer upon the surface of the alumina coated fiber or fabric.

In the case of emulsions or lattices, the particles of the polymer must be sufficiently small to penetrate the fabric or fiber. In the case of fabrics being treated by the processes of this invention, one will ordinarily use a latex diluted to about $1/10$ of one percent filtered through conventional filters or glass wool, or the like; such filters normally permit passage of the colloidal particles. Such lattices may contain particles of up to 2 or 3 microns in size or even larger. Preferably, such particles are less than half a micron in size, although certain particles may range up to as much as 10 microns in size. When larger sized particles are present, a given emulsion must also contain a substantial quantity of particles smaller than this upper limit, otherwise a good coating action upon the alumina coated surface of the fiber will not be obtained.

PRODUCT CHARACTERISTICS

A number of different effects are obtained upon fabrics using the processes of the invention.

For example, a topcoating of organic polymer prevents soap from reacting with the alumina and building up a greasy coating of hard water soap salts, such as calcium or magnesium stearates upon the fiber surfaces treated with the alumina. Application of an alumina coating generally increases friction on the fibrous substrate and imparts anti-soiling, anti-static, anti-pilling, anti-glazing characteristics, all of which are desired qualities. The application of a polymer topcoating over the alumina in in accordance with the processes and products of the invention does not destroy these effects, especially when the topcoating is used in moderate amounts, although such coatings tend to modify or prevent reaction between soap and the alumina, for example. If the alumina coating is covered with a soap layer, for example, certain of the desirable properties of the alumina coating such as soil resistance and anti-static effects may be eliminated and lost in whole or in part.

The alumina particles useful in the processes and products of the invention do not necessarily interlock and bond together, particularly when the particles are non-fibrous. When the alumina particles consist of fibrils such as fibrous boehmite, interlocking and mat formation take place often to great advantage on the surface of the fibrous substrate. Alumina particles useful in this invention can be held to the surfaces of the fibers by chemical bonding and there may be little bonding tendency between the individual alumina particles. The acidic polymers which are the topcoats of this invention promote adhesion of the alumina to particles, to each other, and to the surfaces of the fibres. The film formed by coating with these aluminas alone tends in general not to be continuous, but porous in nature.

The actual quantity of alumina applied to a fibrous substrate surface can vary appreciably depending upon a number of variables such as the type of alumina used, the size and nature of the substrate, the average particle size, surface area characteristics, etc. Irregularly shaped alumina particles tend to contact fiber substrate surface along their largest faces but this is not always the case. For special effects, one might desire to use a lot or even very small quantities of alumina in coating fibrous substrates. In general, one desires to use sufficient alumina to give, in most cases, substantially complete surface coverage of fibrous substrate with a single layer of alumina particles. In such instances, the quantity of alumina used upon a fibrous substrate generally tends to lie in the range from about 0.1 to about 1.0 weight per cent based on the weight of the substrate but these are purely average figures and more or less than this amount can easily be used. In general, the amount of alumina which can be chemically adsorbed upon a fibrous substrate will not exceed about one mono particle layer so that one will usually tend to use basecoats which are not in excess of about one micron in thickness although occasionally much thicker layers of alumina particles can be coated upon fibrous substrates depending upon a number of variables such as type of substrate and alumina being used as well as method of coating. The minimum thickness of the basecoat layer will, of course, thus be something less than a fraction of a millimicron and will not necessarily be uniform.

When multiple coatings are applied, the percent by weight of alumina which is applied is increased proportionately. Although beneficial effects are obtained when the base coating comprises the single particle layer of aluminas, often such a layer is not entirely satisfactory and one chooses to use coatings whch are several particle layers thick. Thus, one might choose to use an alumina base coating which is ten times or more thicker than the average particle diameter of the particular type of alumina particles used.

The quantity of alumina applied can be varied to some extent by the concentration of alumina used in the treating media. For example, when baths are used the proportion of alumina bond upon a fibrous substrate surface from the treatment bath may vary depending upon the quantity of alumina present in the bath and a number of other variables. Since the alumina particles are substantive with respect to the substrate, very dilute dispersions can be used, as explained earlier. For example, even with dilute dispersions of say about 0.04 weight percent or even lower practically all the alumina is removed from the bath if sufficient substrate surface is present in the bath. When an excess of alumina colloid is present in a dispersion, that is when more than enough alumina is available for adsorbing substantively upon the substrate surface, the concentration of the alumina bath can range in such cases from about 2 to 5 weight percent or even higher. When the concentration of alumina in the treating bath is on the higher side, a greater amount of alumina tends to be adsorbed, possibly in closely packed or multiple layers upon fibrous substrate surfaces. The amount which is chemically adsorbed upon the fiber substrate surface, however, will seldom exceed from about 1 to 2 percent by weight of the treated substrate.

In general, the products of the invention are of two general types. If the organic polymer topcoat is applied as a sort of protective coating over the alumina basecoat, in order to preserve and enhance the properties of the alumina basecoat, then the thickness of the topcoat which can be adsorbed on the alumina coating will range from about 10 or less to 500 percent or more of the weight of the adsorbed alumina, in most cases.

On the other hand, if the organic polymer topcoat is applied for its own properties using the alumina as a bonding aid between the fibrous substrate and the polymeric topcoat, then the topcoat will tend to be very much thicker—perhaps amounting to as much as 10 times or more the weight of the original fibrous substrate.

Thus, the amount and/or thickness of topcoat polymer used cannot be stated with definiteness since the amount used in any given situation is subject to so many variables.

The amount of topcoat actually adsorbed upon the alumina, and not merely coated thereon, varies greatly depending upon the type and nature of the polymer used. In general, high molecular weight, colloidal types of polymers show highest adsorption (as on a weight basis). In such cases, the adsorption by weight may be as high as several fold the weight of the alumina. Dispersible polymers, especially soluble ones, depending upon type and molecular weight, may adsorb on the alumina basecoat more readily than non-dispersible polymers. Highly acidic, low molecular weight polymers show adsorption in the lower ranges while high molecular weight polymers having a smaller proportion of acidic groups (say, one acidic group per 200 carbon atoms per polymer chain) show higher adsorption on a weight basis.

While the alumina coatings alone impart desirable characteristics to a fiber or fabric substrate, such alumina coatings frequently impart a harsh feel and/or hand to these fibrous substrates. Application of the acidic polymer topcoatings tends to remove such harshness and impart a "slick" or "warm" hand to the treated fibrous substrate. Such topcoatings, in the case of glass fibers, give added protection from scratching and abrasion, so that the fabrics made from glass fibers coated in accordance with the invention have greatly superior durability compared with glass fiber fabrics made from untreated glass fibers.

As the following examples show, alumina particles as basecoats with the acidic polymer as topcoats produces a wide variety of desirable effects.

*Example 1*

A typical commercial synthetic fiber knit pile fabric comprising a mixture of "Dynel" acrylonitrile/vinyl chloride copolymer fiber made by Union Carbide Chemicals Company and "Orlon" acrylic fiber (a du Pont trademark) is immersed for 10 minutes in a 0.5% aqueous dispersion of "Alon" C alumina (made by Godfrey L. Cabot) at 140° F. After rinsing the treated fabric with two separate portions of deionized water, it is immersed for five minutes in a bath containing a 0.25% emulsion of 75/25 vinyl acetate/potassium 4-vinyl benzene sulfonate polymer prepared by the general procedure according to Example 7 of U.S. Patent 2,837,500. It is then thoroughly rinsed with deionized water to remove excess copolymer and finally dried and fluffed in a tumble drier at 160° F. The alumina-copolymer treatment results in a slicker hand, less tendency to soil and greater ease of soil removal on laundering, with significantly reduced static buildup. Furthermore, the fabric is now more readily dyed with basic dyes. Without the vinyl benzene sulfonate copolymer topcoat, the alumina treated fabric tends to dust and the alumina itself is much less permanent to laundering and dry cleaning.

*Example 2*

This example illustrates the application of alumina to "Orlon" (a du Pont trademark) acrylonitrile fabric followed by topcoating with a methylmethacrylate ethylene sulfonic acid copolymer.

A knit fabric of "Orlon" staple yarn is scoured by agitating the fabric for 20 minutes in 50 parts by weight of an aqueous solution containing 0.1 percent of an aryl alkyl sulfonate scouring agent and 0.1 percent tetrasodium pyrophosphate warmed to 70° C. The scouring bath is cooled to 50° C. and the fabric then rinsed repeatedly with water until free of scouring agents.

The fabric is then dipped into a bath 0.08 percent of fibrous boehmite prepared as follows: An alumina gel is precipitated by simultaneously metering an alum solution containing 1 part $Al_2(SO_4)_3 \cdot 18H_2O$ and 2 parts distilled water and a sodium carbonate solution containing 1 part $Na_2CO_3$ and 4 parts distilled water into the agitated reaction mass in an open tank. The reactant ratio, $CO_3/Al$, is maintained at $1.63 \pm 0.02$ (molar basis) at all times during the precipitation. After precipitation the gel slurry is transferred to a filter Nutsche and filtered using vacuum. The filter cake is washed on the Nutsche using nine successive washes of distilled water at 80° C. Each wash volume is approximately equivalent to the volume of the filter cake. The washed cake is homogenized by mixing 3151 parts cake with 1500 parts in a laboratory Waring Blendor. This homogenized slurry analyzed as:

Percent $Al_2O_3$ ------------------------------ 6.08
Percent Na -------------------------------- 0.002
Percent $SO_4$ ------------------------------ 0.077

The alumina content here and in the product will be expressed as percent $Al_2O_3$, although this does not necessarily show the degree of hydration in a specific aluminum compound present.

To 2790 parts of slurry, 82.5 parts glacial acetic acid and 627 parts distilled water are added and the mixture heated to boiling and refluxed for five minutes. This boiled-out slurry is then charged to a stirred autoclave, brought to 160° C. in 8 minutes, held at this temperature for one hour, and then cooled to 70° C. within 10 minutes and discharged. The product is a translucent fluid sol which has an average fibril length of 332 mu and a specific surface area of 296 m.²/g.

The volume of the alumina treating bath is sufficient to give a total of 2.0% alumina colloid based on the dry weight of the fabric. After agitation for 20 minutes at a bath temperature of about 50° C., the fabric is removed and again rinsed several times in water and squeezed to remove extraneous alumina. The moist fabric is then dipped into a 0.2% solution of the methylmethacrylate/ethylene sulfonic acid copolymer prepared by the procedure of Example 7 of U.S. Patent No. 2,348,705.

The volume of the polymer solution is sufficient so that at least 1% by weight of polymer is present in the bath based on the dry weight of fabric. After agitation at room temperature for about 15 minutes the fabric is withdrawn from the bath rinsed with water and dried at 100° C. for 30 minutes.

Qualitative tests indicate that the above treated fabric has lowered tendency to develop a static charge on the fabric and that any charge which is developed is more easily dissipated on standing at room conditions than an untreated control fabric.

When soiled with an oily soiling composition the treated fabric laundry tests were readily washed clean in standard laundering tests using a 0.25% solution alkyl aryl sulfonate detergent, while under similar conditions the untreated control "Orlon" fabric retained a grayish color and is difficult to wash clean.

*Example 3*

A glass fiber cloth made of spun glass fibers and scoured free of sizing agent is immersed for several minutes in a dispersion of fibrous boehmite prepared as in Example 2.

Then, the treated fabric is rinsed several times in water. The moist glass fabric is immersed for several minutes in about 20 times its weight of an aqueous solution containing 5% by weight of the mixed monomers of 2-vinylbenzenesulfonic acid and 4-vinylbenzenesulfonic acid.

The fabric is rinsed with water and then is quickly dipped into about 10 times its weight of a 0.1% by weight solution of ammonium pensulfate and 0.05% by weight sodium bisulfite. The fabric is then dried at 70–100° C. in an air circulating oven until thoroughly dried.

The treated fabric has a smoother, softer hand than the untreated glass fabric. The untreated fabric is also more brittle than the treated fabric, as shown by repeated flexing of each fabric.

*Example 4*

This example illustrates the use of fibrous boehmite alumina as an anchoring agent for vinylbenzene sulfonic acid in bonding a polyester resin to glass fiber cloth. A Type 181 glass fabric cloth is dipped into a 0.25% sol of fibrous boehmite prepared as described in Example 2 and then thoroughly dried at 110° C. This treated glass cloth is then dipped into a 0.5% solution of vinyl benzenesulfonic acid, removed, and again thoroughly dried at 110° C. A 12-ply laminate lay is made according to military specification MILF-9118 using selectron 5003 polyester resin marketed by Pittsburgh Plate Glass Co.

This application is a continuation-in-part of my copending application Serial No. 730,023, filed April 21, 1958, now abandoned.

The claims are:

1. A fibrous substrate bearing a basecoat of alumina particles said alumina particles being less than 1.5 microns in largest average dimension and having an average specific surface area of at least 10 square meters per gram and a topcoat of an organic polymer containing sulfonic acid radicals, said organic polymer having a molecular weight of at least 500 and having at least 1 weight percent of lateral free sulfonic acid radicals, and said fibrous substrate being a material which, without the alumina base coat, is negatively charged with respect to the alumina particles.

2. The product of claim 1 wherein the alumina is a fibrous boehmite.

3. The product of claim 1 wherein the alumina is an amorphous gel.

4. The product of claim 1 wherein the alumina is a gamma alumina produced by thermal hydrolysis.

5. The product of claim 1 wherein the fibrous substrate is a polyamide.

6. The product of claim 1 wherein the fibrous substrate is a poly(ethylene-terephthalate).

7. The product of claim 1 wherein the fibrous substrate is a polyacrylonitrile.

References Cited in the file of this patent

UNITED STATES PATENTS

| | | |
|---|---|---|
| 2,085,129 | Stoewener | June 29, 1937 |
| 2,323,387 | Edelstein | July 6, 1943 |
| 2,560,707 | Stark | July 17, 1951 |
| 2,734,834 | Rainard et al. | Feb. 14, 1956 |
| 2,734,835 | Florio et al. | Feb. 14, 1956 |
| 2,819,177 | Conn et al. | Jan. 7, 1958 |
| 2,915,475 | Bugosh | Dec. 1, 1959 |